(12) United States Patent
Zhou et al.

(10) Patent No.: US 10,225,866 B2
(45) Date of Patent: Mar. 5, 2019

(54) SYSTEMS, METHODS, AND DEVICES FOR ENHANCED OFDMA RANDOM ACCESS

(71) Applicant: QUALCOMM Incorporated, San Diego, CA (US)

(72) Inventors: Yan Zhou, San Diego, CA (US); Alfred Asterjadhi, San Diego, CA (US); Simone Merlin, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 15/182,536

(22) Filed: Jun. 14, 2016

(65) Prior Publication Data

US 2017/0079071 A1 Mar. 16, 2017

Related U.S. Application Data (60) Provisional application No. 62/219,334, filed on Sep. 16, 2015, provisional application No. 62/242,083, filed on Oct. 15, 2015.

(51) Int. Cl.
*H04W 4/00* (2018.01)
*H04W 74/08* (2009.01)
(Continued)

(52) U.S. Cl.
CPC ....... *H04W 74/0833* (2013.01); *H04L 5/0094* (2013.01); *H04L 27/261* (2013.01);
(Continued)

(58) Field of Classification Search
None
See application file for complete search history.

(56) References Cited

U.S. PATENT DOCUMENTS 9,756,612 B2 * 9/2017 Park ................. H04W 72/02
9,788,317 B2 * 10/2017 Ghosh ............. H04W 72/0446
(Continued)

FOREIGN PATENT DOCUMENTS

EP 2938153 A1 10/2015
WO WO-2007052972 A1 5/2007
(Continued)

OTHER PUBLICATIONS

International Search Report and Written Opinion—PCT/US2016/047201—ISA/EPO—dated Nov. 8, 2016.

*Primary Examiner* — Bob A Phunkulh
(74) *Attorney, Agent, or Firm* — Knobbe, Martens, Olson & Bear LLP (57) ABSTRACT

Systems, methods, and apparatuses for signaling and generating an enhanced random access frame in a wireless network are provided. One aspect of this disclosure provides a method of wireless communication. The method includes receiving, at a first device, a first frame from a second device indicating one or more frequency bandwidths available for random access by the first device. The method further includes transmitting, at the first device, a second frame to the second device in response to the first frame, the second frame comprising an indication of an identifier of the first device and indicating a selection of at least one frequency bandwidth of the one or more frequency bandwidths, the second frame not including a medium access control (MAC) payload data portion.

29 Claims, 7 Drawing Sheets

(51) Int. Cl.
*H04L 27/26* (2006.01)
*H04L 5/00* (2006.01)
*H04W 72/00* (2009.01)

(52) U.S. Cl.
CPC ...... *H04L 27/2602* (2013.01); *H04L 27/2613* (2013.01); *H04W 72/00* (2013.01); *H04L 5/0007* (2013.01)

(56) References Cited

U.S. PATENT DOCUMENTS

| | | | | |
|---|---|---|---|---|
| 2008/0273610 | A1* | 11/2008 | Malladi | H04L 1/0029 375/260 |
| 2011/0013542 | A1* | 1/2011 | Yu | H04W 74/006 370/280 |
| 2011/0310857 | A1* | 12/2011 | Vujcic | H04W 74/0833 370/336 |
| 2012/0039284 | A1 | 2/2012 | Barbieri et al. | |
| 2012/0230261 | A1* | 9/2012 | Pradas | H04W 74/08 370/329 |
| 2013/0286959 | A1* | 10/2013 | Lou | H04W 72/04 370/329 |
| 2014/0204891 | A1* | 7/2014 | Park | H04W 56/00 370/329 |
| 2014/0233478 | A1* | 8/2014 | Wentink | H04L 5/0055 370/329 |
| 2015/0244619 | A1* | 8/2015 | Zheng | H03M 13/09 370/392 |
| 2015/0373740 | A1* | 12/2015 | Eriksson | H04W 74/0833 370/329 |
| 2016/0007377 | A1* | 1/2016 | Frenne | H04W 56/001 370/329 |
| 2016/0183323 | A1* | 6/2016 | Rahman | H04W 74/0833 370/329 |
| 2017/0104570 | A1* | 4/2017 | Kim | H04L 5/0055 |
| 2017/0127440 | A1* | 5/2017 | Chun | H04W 72/1284 |
| 2017/0149547 | A1* | 5/2017 | Kim | H04L 5/0055 |
| 2017/0171787 | A1* | 6/2017 | Fu | H04W 36/08 |
| 2017/0196010 | A1* | 7/2017 | Matsuo | H04W 72/0453 |
| 2017/0245306 | A1* | 8/2017 | Kim | H04W 74/0833 |
| 2017/0272138 | A1* | 9/2017 | Chun | H04B 7/0613 |
| 2017/0273112 | A1* | 9/2017 | Lou | H04W 74/0825 |

FOREIGN PATENT DOCUMENTS

| | | |
|---|---|---|
| WO | WO-2007126302 A1 | 11/2007 |
| WO | WO-2014110714 A1 | 7/2014 |

* cited by examiner

SYSTEMS, METHODS, AND DEVICES FOR ENHANCED OFDMA RANDOM ACCESS

CROSS-REFERENCE TO RELATED APPLICATION INFORMATION

The present Application for Patent claims priority to Provisional Application No. 62/219,334 entitled "SYSTEMS, METHODS, AND DEVICES FOR ENHANCED OFDMA RANDOM ACCESS" filed Sep. 16, 2015, and Provisional Application No. 62/242,083 entitled "SYSTEMS, METHODS, AND DEVICES FOR ENHANCED OFDMA RANDOM ACCESS" filed Oct. 15, 2015, both of which are expressly incorporated by reference herein.

BACKGROUND

Field

The present application relates generally to wireless communications, and more specifically to systems, methods, and devices for enhanced orthogonal frequency-division multiple access (OFDMA) random access communication in a wireless network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN).

As wireless communications continue to advance, communication schemes continue to grow more complicated, there may be a need to more efficiently transmit messages and frames across various communication schemes.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of the present application provides a method for wireless communication. The method comprises receiving, at a first device, a first frame from a second device indicating one or more frequency bandwidths available for random access by the first device. The method further comprises transmitting, at the first device, a second frame to the second device in response to the first frame, the second frame comprising an indication of an identifier of the first device and indicating a selection of at least one frequency bandwidth of the one or more frequency bandwidths, the second frame not including a medium access control (MAC) payload data portion.

Another aspect of the present application provides a method for wireless communication. The method comprises transmitting, at a first device, a first frame to a second device indicating one or more frequency bandwidths available for random access by the second device. The method further comprises receiving, at the first device, a second frame from the second device in response to the first frame, the second frame comprising an indication of an identifier of the second device and indicating a selection of at least one frequency bandwidth of the one or more frequency bandwidths, the second frame not including a medium access control (MAC) payload data portion.

Another aspect of the present application provides an apparatus for wireless communication. The apparatus comprises a receiver configured to receive a first frame from a second device indicating one or more frequency bandwidths available for random access. The apparatus further comprises a transmitter configured to transmit a second frame to the second device in response to the first frame, the second frame comprising an indication of an identifier of the apparatus and indicating a selection of at least one frequency bandwidth of the one or more frequency bandwidths, the second frame not including a medium access control (MAC) payload data portion.

Another aspect of the present application provides an apparatus for wireless communication. The apparatus comprises a transmitter configured to transmit a first frame to a second device indicating one or more frequency bandwidths available for random access by the second device. The apparatus further comprises a receiver configured to receive a second frame from the second device in response to the first frame, the second frame comprising an indication of an identifier of the second device and indicating a selection of at least one frequency bandwidth of the one or more frequency bandwidths, the second frame not including a medium access control (MAC) payload data portion.

Yet another aspect of the present application provides a non-transitory computer-readable medium comprising code that, when executed, causes the apparatus to perform a method, the method comprises receiving, at a first device, a first frame from a second device indicating one or more frequency bandwidths available for random access by the first device. The method further comprises transmitting, at the first device, a second frame to the second device in response to the first frame, the second frame comprising an indication of an identifier of the first device and indicating a selection of at least one frequency bandwidth of the one or more frequency bandwidths, the second frame not including a medium access control (MAC) payload data portion.

Yet another aspect of the present invention provides a non-transitory computer-readable medium comprising code that, when executed, causes an apparatus to perform a method, the method comprises transmitting, at a first device, a first frame to a second device indicating one or more frequency bandwidths available for random access by the second device. The method further comprises receiving, at the first device, a second frame from the second device in response to the first frame, the second frame comprising an indication of an identifier of the second device and indicating a selection of at least one frequency bandwidth of the one or more frequency bandwidths, the second frame not including a medium access control (MAC) payload data portion.

Yet another aspect of the present application provides an apparatus for wireless communication. The apparatus comprises means for receiving, at a first device, a first frame from a second device indicating one or more frequency bandwidths available for random access by the first device. The apparatus further comprises means for transmitting, at the first device, a second frame to the second device in response to the first frame, the second frame comprising an indication of an identifier of the first device and indicating a selection of at least one frequency bandwidth of the one or more frequency bandwidths, the second frame not including a medium access control (MAC) payload data portion.

Yet another aspect of the present invention provides an apparatus for wireless communication. The apparatus comprises means for transmitting, at a first device, a first frame to a second device indicating one or more frequency bandwidths available for random access by the second device. The apparatus further comprises means for receiving, at the first device, a second frame from the second device in response to the first frame, the second frame comprising an indication of an identifier of the second device and indicating a selection of at least one frequency bandwidth of the one or more frequency bandwidths, the second frame not including a medium access control (MAC) payload data portion.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("AP") and clients (also referred to as stations, or "STA"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency-Division Multiple Access (OFDMA) systems, Single-Carrier Frequency-Division Multiple Access (SC-FDMA) systems, and so forth. An SDMA system may utilize sufficiently different directions to concurrently transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency-division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (II-DMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") may also comprise, be implemented as, or known as a user terminal ("UT"), an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Figure 1:
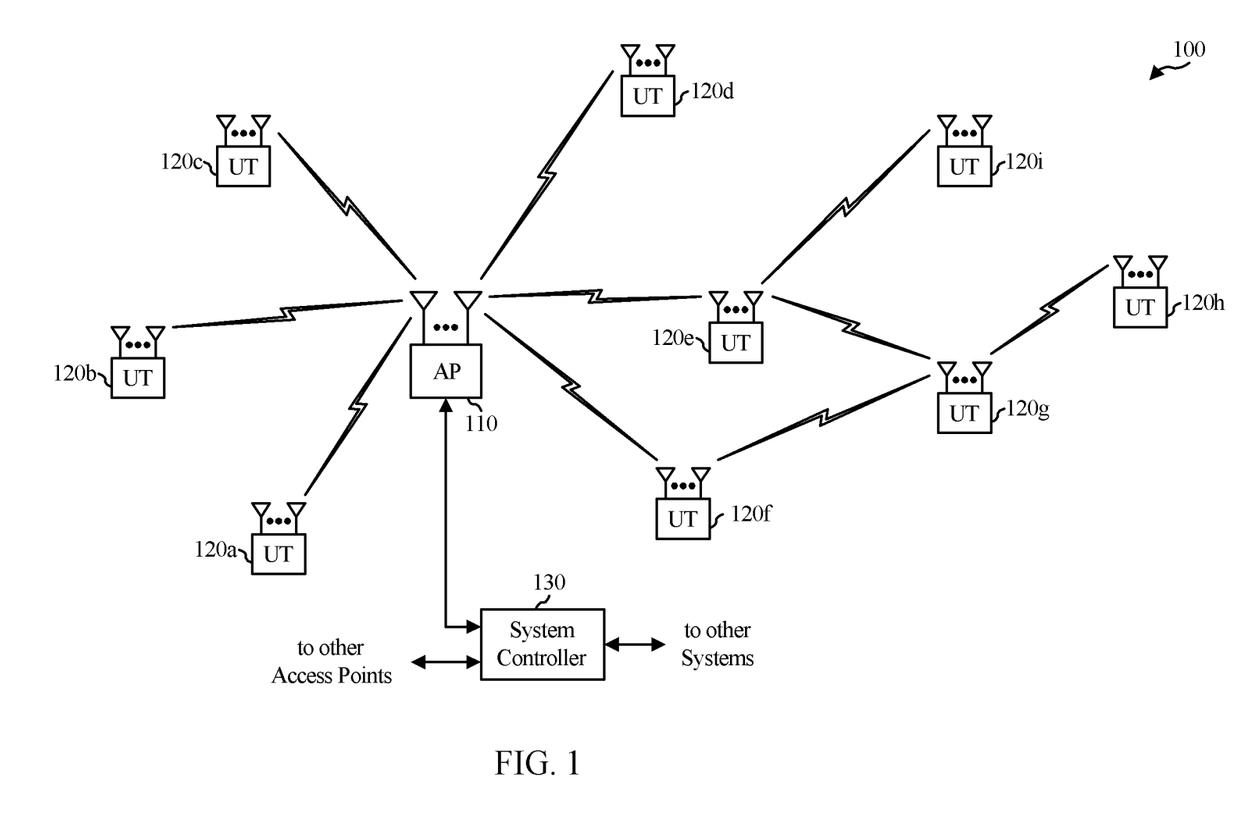
FIG. 1 illustrates a multiple-access multiple-input multiple-output (MIMO) system with access points and user terminals.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or using some other terminology. A user terminal or STA may be fixed or mobile and may also be referred to as a mobile station or a wireless device, or using some other terminology. The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The system 100 may be a time division duplex (TDD) system or a frequency-division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
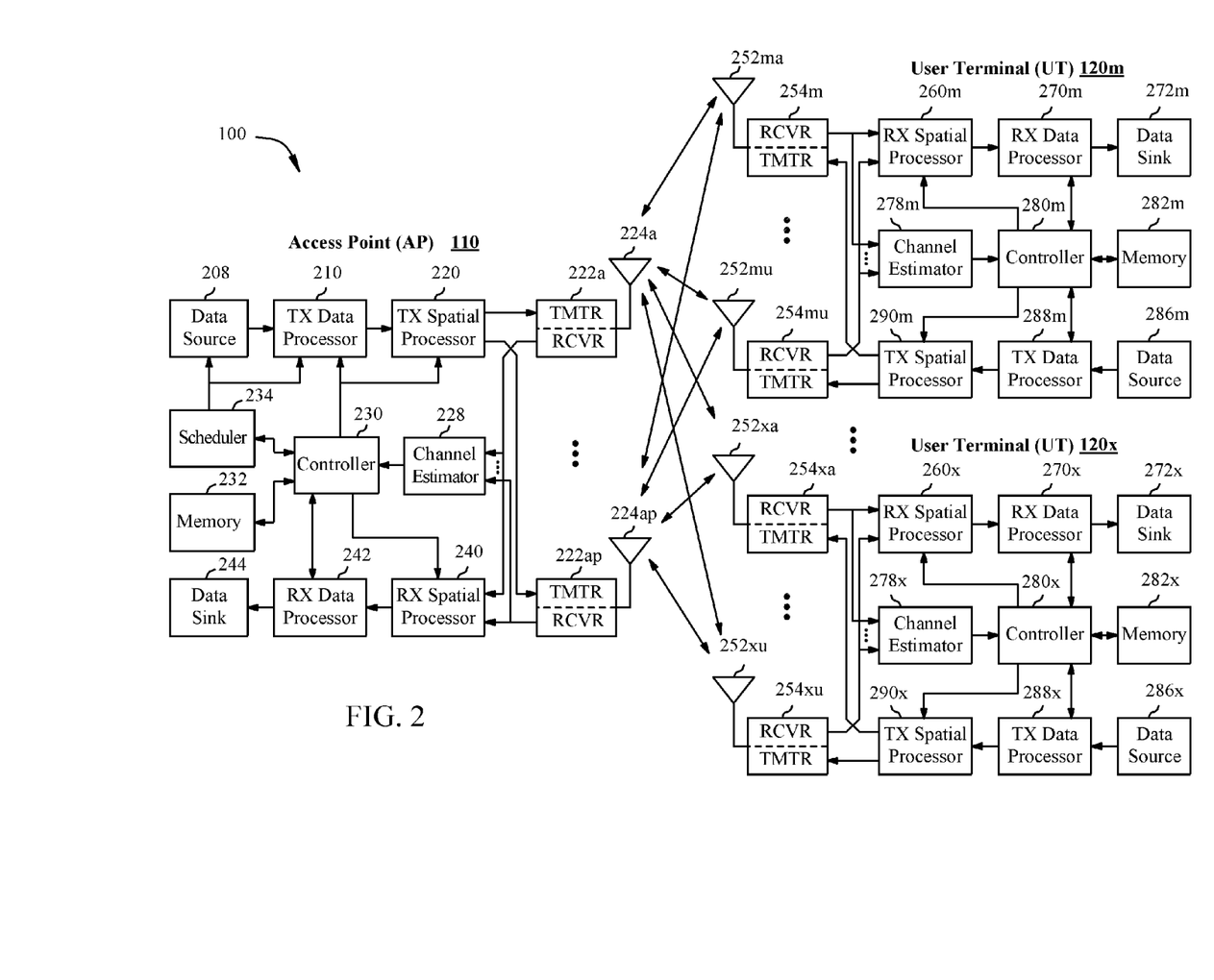
FIG. 2 illustrates a block diagram of the access point 110 and two user terminals 120m and 120x in a MIMO system.

FIG. 2 illustrates a block diagram of the access point 110 and two user terminals 120m and 120x in MIMO system 100. The access point 110 is equipped with $N_t$ antennas 224a through 224ap. The user terminal 120m is equipped with $N_{ut,m}$ antennas $252_{ma}$ through $252_{mu}$, and the user terminal 120x is equipped with $N_{ut,x}$ antennas $252_{xa}$ through $252_{xu}$. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{up}$ antennas 224a through 224$_{ap}$ receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the user terminals 120.

At each user terminal 120, $N_{ut,m}$ antennas 252 receive the $N_{up}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point 110 based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
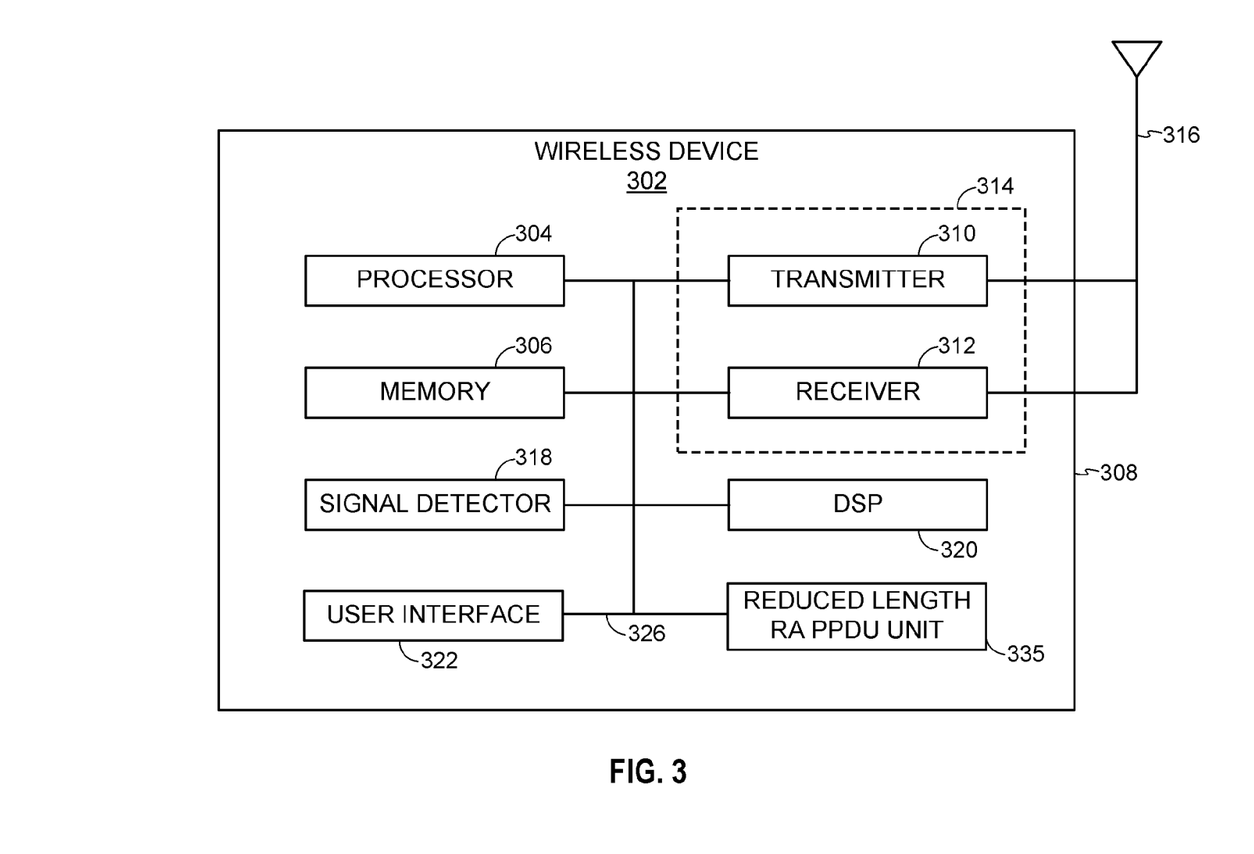
FIG. 3 illustrates various components that may be utilized in a wireless device that may be employed within a wireless communication system.

FIG. 3 illustrates various components that may be utilized in a wireless device 302 that may be employed within the system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers. Thus, in some implementations, the transmitter 310 may comprise or form at least a portion of means for transmitting a frame. Likewise, the receiver 312 may comprise or form at least a portion of means for receiving a frame.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The wireless device 302 may further comprise a user interface 322 in some aspects. The user interface 322 may comprise a keypad, a microphone, a speaker, and/or a display. The user interface 322 may include any element or component that conveys information to a user of the wireless device 302 and/or receives input from the user.

In some aspects, the wireless device 302 may further comprise a reduced length random access (RA) physical layer protocol data unit (PPDU) unit 335. The reduced length RA PPDU unit 335 may be configured to adjust the length of a RA PPDU frame. The reduced length RA PPDU unit 335 may also be configured to indicate an identifier of a device sending the reduced length RA PPDU frame. In some aspects, transmitting and/or signaling a reduced length RA PPDU frame can allow for efficient use of the wireless medium and reduce overhead.

The various components of the wireless device 302 may be coupled together by a bus system 326, which may include a power bus, a control signal bus, and a status signal bus in addition to a data bus.

Certain aspects of the present disclosure support utilizing a reduced length random access (RA) PPDU in OFDMA systems. In conventional OFDMA RA systems, an AP (e.g., AP 110) sends a frame (e.g., trigger frame) to one or more user terminals (e.g., UT 120) or stations (STAs) to indicate certain channel frequency bandwidths (BWs) available for random access by the STAs. In response, the STAs may randomly select one or multiple BWs of the indicated channel BWs to transmit uplink (UL) communications to the AP 110. In some aspects, the UL communications may comprise an UL PPDU which may include at least one medium access control (MAC) protocol data unit (MPDU) carrying control or data information. In some embodiments, the UL PPDUs sent from multiple STAs over the one or more indicated channel frequency BWs may result in collisions and inefficiencies. For example, in some aspects, it may only be possible to achieve an efficiency of 35% using conventional OFDMA RA protocols. Additionally, as UL PPDU size increases, the inefficient and amount of wasted medium or BWs may also increase.

Accordingly, in some embodiments, it may be beneficial to reduce wasted medium by reducing UL RA PPDU size. Certain aspects disclosed herein related to utilizing a reduced UL RA PPDU which may comprise a physical layer (PHY) preamble, a null data packet (NDP) frame, or a PHY waveform which do not contain a MAC data portion. In some aspects, the reduced UL RA PPDU may comprise an identifier of the device or STA transmitting the reduced UL RA PPDU. A non-limiting benefit of using a reduced UL RA PPDU instead of a full sized UL RA PPDU which contains control or data information is that the reduced UL RA PPDU may result in less wasted medium if a collision between reduced UL RA PPDUs occurs or if no transmission happens. This may be because the reduced UL RA PPDU utilizes less of the medium which may be reused for other communications. In some aspects, if the AP 110 detects an identifier of the STA sending the reduced UL RA PPDU, the AP 110 may schedule or allocate a resource unit to receive a subsequent UL RA PPDU that comprises full control or data information from the corresponding STA identified in the reduced UL RA PPDU.

Figure 4A:
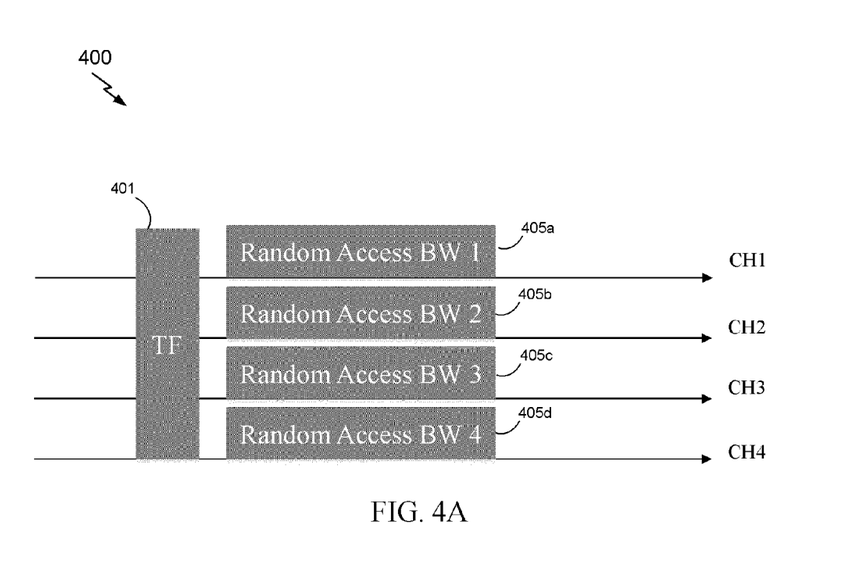
FIG. 4A is a time sequence diagram of an exemplary frame exchange of an orthogonal frequency-division multiple access (OFDMA) random access scheme.

FIG. 4A is a time sequence diagram of an exemplary frame exchange of an orthogonal frequency-division multiple access (OFDMA) random access scheme 400. As shown, an AP (e.g., AP 110) transmits a trigger frame 401 to one or more STAs. In some aspects, the trigger frame 401 indicates one or more frequency bandwidths (BWs) available for random access (RA) by the STAs for the STAs to uplink data. In some aspects, the trigger frame 401 comprises a predefined frame that allocates resources for RA. As shown, the trigger frame 401 indicates to the STAs that four channel frequency BWs (i.e., BW 1 405a, BW 2 405b, BW 3 405c, and BW 4 405d) are available for RA. In some aspects, the BWs 1-4 405a-d each comprises a 20 MHz channel frequency BW of an 80 MHz frequency bandwidth although other BW values are possible.

In some aspects, the trigger frame 401 may specify a duration or format for an UL PPDU sent by the STAs in response to the trigger frame 401. In some embodiments, the duration corresponds to different UL RA packet formats (e.g., formed with at least one of LSIG, R-LSIG, HE SIG-A, HE-STF, HE LTF, etc.). For example, a duration or format can correspond to a UL RA PPDU format with the combination of LSIG+R-LSIG+HE SIG-A+HE-STF+HE-LTF. In some aspects, the STAs receiving the trigger frame 401 may transmit their UL RA PPDU based on the duration or format indicated in the trigger frame 401. For example, the STA should transmit the UL RA PPDU packet by obeying the indicated duration or format.

Additionally, the trigger frame 401 may also specify the STAs that are to respond to the trigger frame 401 and send UL communications. In some aspects, the trigger frame 401 includes association identifiers (AIDs) or other STA IDs of the STAs that are allowed to send UL RA PPDUs. The AIDs may be tied to a particular resource unit (e.g., space, time, frequency, etc.) where the AP 110 expects the STA of the particular AID to send at least part of its UL RA PPDU packet, e.g. HE-LTF. In some aspects, the HE-LTF may have a particular tone ON/OFF pattern matching the STA ID.

Figure 4B:
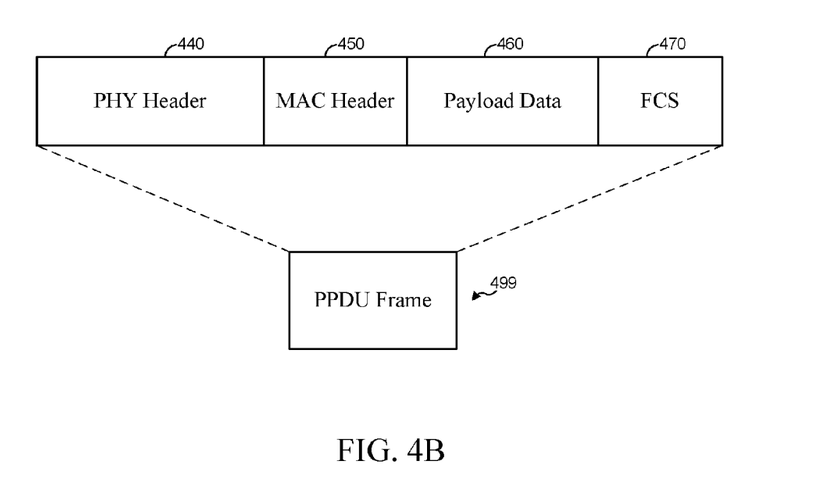
FIG. 4B shows a diagram of an exemplary physical layer protocol data unit (PPDU) frame.

FIG. 4B is a diagram illustrating an exemplary embodiment of a PPDU frame 499. As shown in FIG. 4B, the PPDU frame 499 comprises a physical layer (PHY) header 440, a MAC header field 450, a payload data portion 460, and a frame check sequence (FCS) field 470. The PHY header 415 may be used to acquire an incoming OFDM signal, to train and synchronize a demodulator, and may aid in demodulation and delivery of the payload data portion 460.

Figure 5:
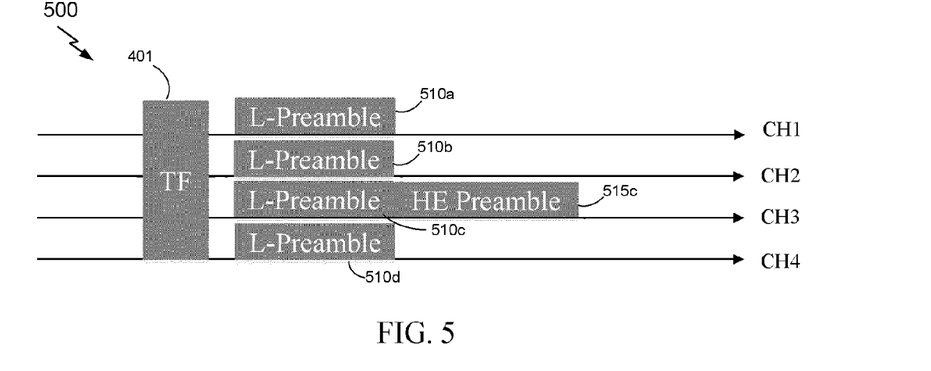
FIG. 5 is a time sequence diagram of another exemplary frame exchange of an OFDMA random access scheme using a physical layer preamble field.

FIG. 5 is a time sequence diagram of an exemplary frame exchange of an OFDMA random access scheme 500 utilizing a PHY preamble field or PHY preamble portion. As shown, and similar to FIG. 4A, the AP 110 transmits the trigger frame 401. In response, a STA may attempt to utilize one or more of the BWs or resource units indicated in the trigger frame 401. In FIG. 5, a STA responding to the trigger frame 401 transmits a legacy (L) PHY preamble (e.g., L-Preamble 510a-d, which is used in 802.11a) on all the channel frequency BWs indicated in the trigger frame 401 (e.g., CH1-4). In some aspects, the STA may only send the legacy PHY preamble on the one or more channel frequency BWs the STA selects from the available channel frequency BWs indicated in the trigger frame 401 (e.g., CH3 as described below). For example, as shown in FIG. 5, after the STA sends the L-Preambles 510a-d, the STA also sends at least part of a high efficiency (HE) PHY preamble (HE Preamble, which is used in 802.11ax or future standards) 515c on its selected channel frequency BW (e.g., CH3). In some aspects, the HE Preamble 515c includes an identifier (ID) identifying the STA (e.g., medium access control (MAC) identifier, association identifier (AID), partial association identifier (PAID), or other STA ID).

In some embodiments, the HE Preamble 515c may comprise one or more of a HE short training field (STF), a HE long training field (LTF), and a HE signal (SIG) field. In some aspects, the STA ID may be indicated in the HE Preamble 515c by HE-STF and/or HE-LTF fields via a particular pilot tone ON/OFF pattern. In some aspects, the STA ID may be indicated in the HE-SIG field of HE Preamble 515c by using reserved bits, or using dedicated new subfield in the HE-SIG field. In other aspects, the STA ID may be indicated in the HE-SIG field by redefining bits in an existing field (e.g., service field) and using one or more reserved bits to indicate the presence of the STA ID within the HE-SIG field. In other aspects, the STA ID may be indicated in the HE-SIG field by generating bits of the HE-SIG field cyclic redundancy check (CRC) field with the STA ID as input, or by generating a value of a scrambling sequence that scrambles the SIG field the HE-SIG field with the STA ID.

Figure 6:
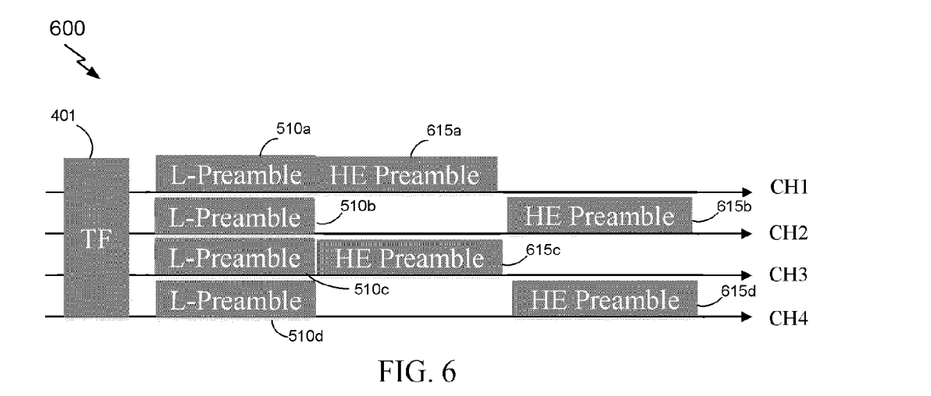
FIG. 6 is a time sequence diagram of another exemplary frame exchange of an OFDMA random access scheme using multiple physical layer preamble fields.

FIG. 6 is a time sequence diagram of another exemplary frame exchange of an OFDMA random access scheme using multiple physical layer preamble fields. In FIG. 6, the AP 110 sends trigger frame 401 indicating at least one channel frequency BWs (e.g., CH1-4) available for random access by the STA. In some aspects, the BWs available for random access may comprise one or more resource units. The STA may respond to the trigger frame 401 by transmitting multiple HE preambles (or partial HE preambles) in the time/frequency resource units reserved for RA. In some aspects, the STA may decide which resource unit to choose for sending the one or more HE preambles. In some aspects, the STA may randomly choose at least one resource unit, choose more resource units if last RA trial gets no response, or choose at least one resource unit based on the AP 110 feedback on RA medium occupancy and/or collision history (e.g., choose less resource units if medium occupancy is large or collision rate is high).

FIG. 6 illustrates an example where each of the channel frequency BWs (e.g., CH1-4) indicated in the trigger frame 401 comprises 3 time slots. During the first time slot, the STA sends the legacy preambles (L-Preamble 510a-d) over all the channels CH1-4. During the second time slot, the STA may transmit HE Preambles 615a and 615c over channels CH1 and CH3, respectively. During the time slot, the STA may transmit HE Preambles 615b and 615d over channels CH2 and CH4, respectively.

In some embodiments, the AP 110 may reserve the total time and/or frequency available for RA via the trigger frame 401, e.g., by setting a network allocation vector (NAV) and indicating the used total bandwidth. In some aspects, the AP 110 may also indicate individual resource units for the STA to send each HE preamble 615. For example, in some embodiments, the AP 110 may indicate in the trigger frame 401 that each resource unit corresponds to a frequency BW and a time slot. The STA transmits HE preambles in randomly selected resource units.

Figure 7:
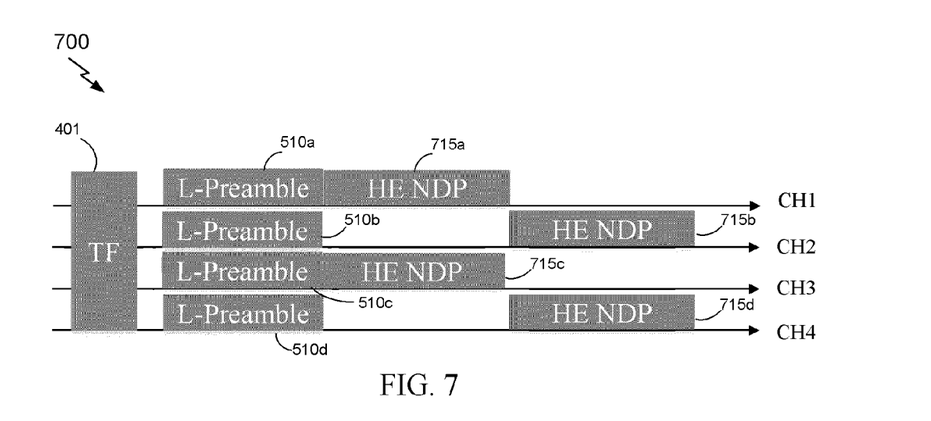
FIG. 7 is a time sequence diagram of another exemplary frame exchange of an OFDMA random access scheme using an NDP frame.

In some embodiments, instead of transmitting a HE preamble, the STA may alternatively send a HE null data packet (NDP), which includes a HE preamble and a HE MAC header portion. FIG. 7 is a time sequence diagram of another exemplary frame exchange of an OFDMA random access scheme 700 using multiple HE NDP frames 715a-d. The OFDMA random access scheme 700 is similar to and adapted from the OFDMA random access scheme 600 of FIG. 6. Only differences between the OFDMA random access scheme 600 and 700 are discussed for the sake of brevity.

In FIG. 7, in response to the trigger frame 401, the STA may transmit HE NDP frames 715a and 715c in the second resource unit of channels CH1 and CH3 and transmit HE NDP frames 715b and 715d in the third resource unit of channels CH2 and CH4. In some aspects, the HE MAC header portion of the HE NDP frames 715a-d may include one or more HE control fields. The one or more HE control fields may carry an identifier (ID) identifying the STA and/or other control info (e.g., buffer status, resource request, block acknowledgment, etc.).

Figure 8:
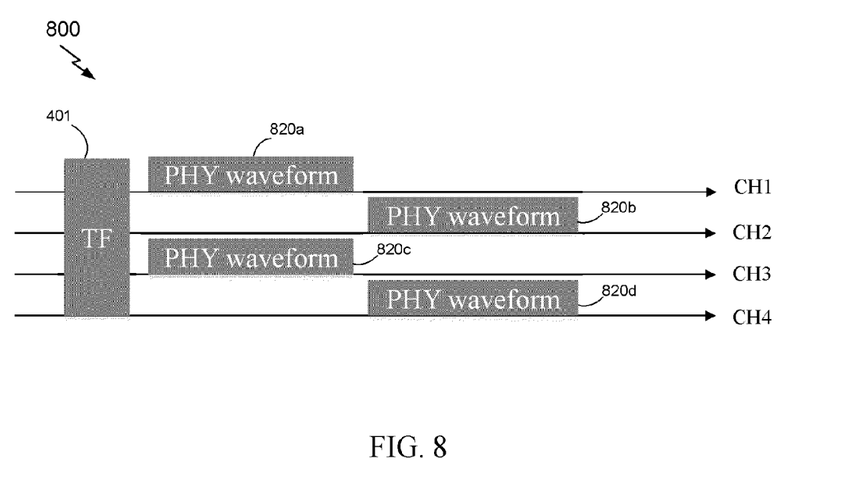
FIG. 8 is a time sequence diagram of another exemplary frame exchange of an OFDMA random access scheme using a physical layer waveform.

In some embodiments, instead of transmitting a HE preamble or an HE NDP, the STA may alternatively send one or more PHY waveforms. FIG. 8 is a time sequence diagram of another exemplary frame exchange of an OFDMA random access scheme 800 using multiple physical layer (PHY) waveforms 820a-d. In some aspects, the PHY waveforms 820a-d each occupies a certain frequency BW and time duration, e.g. 20 MHz and 4 us. In some aspects, a legacy preamble (e.g., L-Preambles 510a-d of FIGS. 5-7) may or may not be transmitted when utilizing a PHY waveform 820. In FIG. 8, in response to the trigger frame 401, the STA may transmit PHY waveforms 820a and 820c in a first resource unit of channels CH1 and CH3 and transmit PHY waveforms 820b and 820d in a second resource unit of channels CH2 and CH4. The PHY waveforms 820a-d may identify the STA ID and can be assigned by the AP 110 or generated by the STA based on a common procedure with the STA ID as input. In some aspects, the mapping of the STA ID to the waveform can be determined by the AP 110 which can also broadcast the mapping, or by the STA based on the common procedure which may be defined in an 802.11 standard. A non-limiting benefit of using PHY waveforms 820a-d may be that the PHY waveforms 820a-d may have good autocorrelation compared to options. Because of such autocorrelation, the AP 110 may identify collided waveforms by performing correlation detection.

In some embodiments, after transmitting a reduced RA PPDU (e.g., HE Preamble 515 or 615, HE NDP 715, or PHY waveform 820), the STA may then transmit a third frame to the AP 110. In some aspects, the third frame comprises an UL PPDU with full control/data information (e.g., payload data portion 460). In turn, if the AP 110 receives the reduced RA PPDU including the STA ID, the AP 110 may schedule one or more resource units (e.g., channel frequency BWs) to receive an UL PPDU with full control/data info from the corresponding STA.

Figure 9:
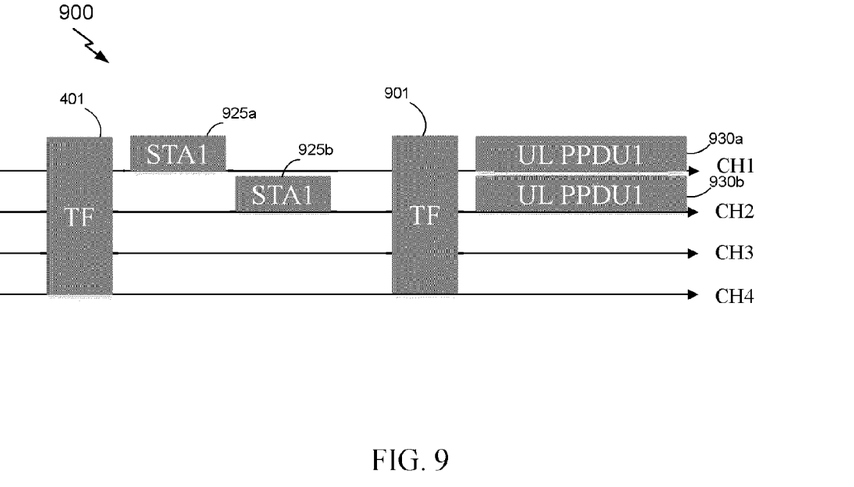
FIG. 9 is a time sequence diagram of another exemplary frame exchange of an OFDMA random access scheme between an access point and a station.

FIG. 9 is a time sequence diagram of another exemplary frame exchange of an OFDMA random access scheme 900 between the AP 110 and a STA. As shown, the AP 110 transmits the trigger frame 401 indicating resource units (e.g., channel frequency BWs CH1-4) available for RA by the STA. In response to the trigger frame 401, the STA transmits message 925*a* over a first resource unit (e.g., CH1 during a first time period) and message 925*b* over a second resource unit (e.g., CH2 during a second time period). In some aspects, the messages 925*a* and 925*b* may comprise at least a part of HE preamble, a HE NDP, or a PHY waveform which includes a STA ID of the STA. After receiving the messages 925*a* and 925*b*, the AP 110 then sends a second trigger frame 901 to schedule the STA to send at least one UL PPDU. The STA may also indicate in message 925*a* and 925*b* the desired CHs to send the at least one UL PPDU. In this example, the AP 110 schedules the STA to send UL PPDU1 930*a* over CH1 and UL PPDU2 930*b* over CH2. The choice of CH1 & 2 can be from STA's feedback or purely decided by the AP 110.

Figure 10:
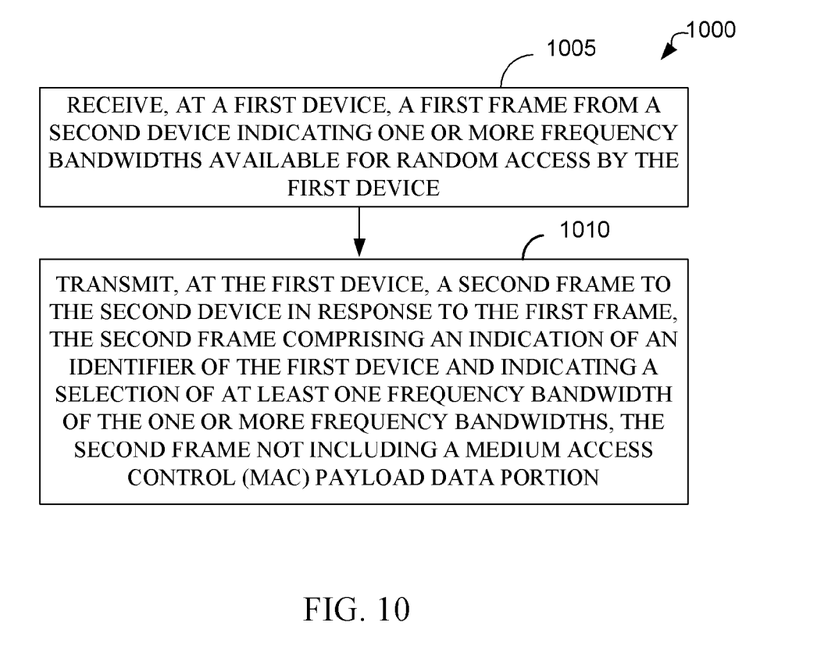
FIG. 10 is a flowchart of a method of wireless communication, in accordance with an implementation.

FIG. 10 is a flowchart of a method 1000 for wireless communication, in accordance with an implementation. In some aspects, the method 1000 may be performed by the wireless device 302, shown above with respect to FIG. 3. In some aspects, method 1000 may be performed by the AP 110, the UT 120, a STA, or any suitable device.

At block 1005, a device may receive a first frame from a second device indicating one or more frequency bandwidths available for random access by the device. For example, a STA may receive the trigger frame 401 from the AP 110 indicating one or more frequency bandwidths available for random access. At block 1010, the device may transmit a second frame to the second device in response to the first frame, the second frame comprising an indication of an identifier of the first device and indicating a selection of at least one frequency bandwidth of the one or more frequency bandwidths, the second frame not including a medium access control (MAC) payload data portion. For example, the STA may respond to the trigger frame 401 with the message 925 including the STA ID and a selection of the channel frequency bandwidths CH1 and CH2.

Figure 11:
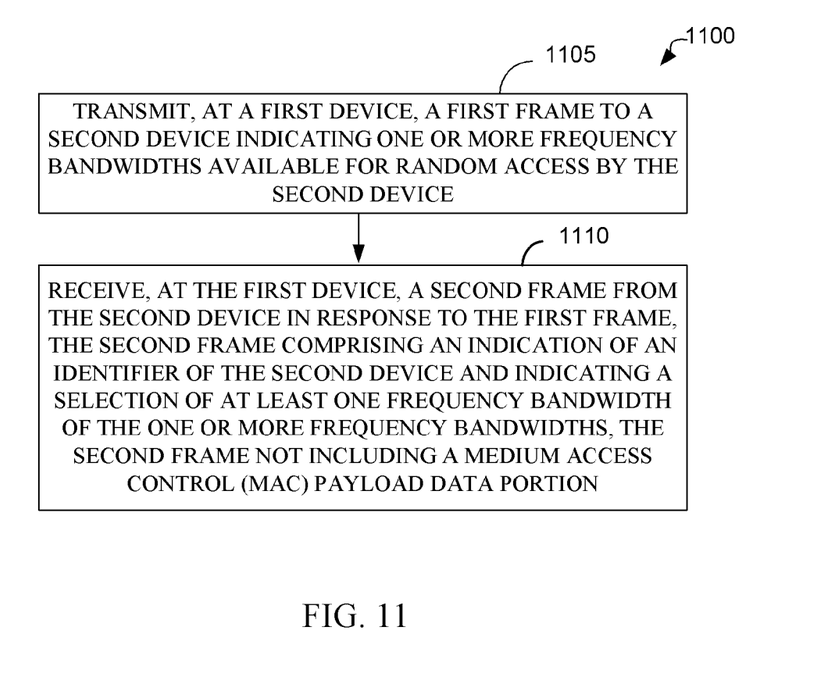
FIG. 11 is a flowchart of a method for wireless communication, in accordance with an implementation

FIG. 11 is a flowchart of a method 1100 for wireless communication, in accordance with an implementation. In some aspects, the method 1100 may be performed by the wireless device 302, shown above with respect to FIG. 3. In some aspects, method 1000 may be performed by the AP 110, the UT 120, a STA, or any suitable device.

At block 1105, a device may transmit a first frame to a second device indicating one or more frequency bandwidths available for random access by the device. For example, the AP 110 may transmit the trigger frame 401 to a STA indicating one or more frequency bandwidths available for random access. At block 1110, the device may receive a second frame from the second device in response to the first frame, the second frame comprising an indication of an identifier of the second device and indicating a selection of at least one frequency bandwidth of the one or more frequency bandwidths, the second frame not including a medium access control (MAC) payload data portion. For example, AP 110 may receive the message 925 from the STA including the STA ID of the STA and a selection of the channel frequency bandwidths CH1 and CH2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some embodiments, an interface may comprise a receiver configured to receive information or communications from a device at another device. The interface (e.g., of a processor or a bus) may receive information or data processed by a front end or another device or may process information received. In some embodiments, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal 120 and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal 120 and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication, comprising:
receiving, at a first device, a first frame from a second device indicating one or more frequency bandwidths available for random access by the first device;
transmitting, at the first device, a second frame to the second device in response to the first frame, the second frame comprising an indication of an identifier of the first device and indicating a selection of at least one frequency bandwidth of the one or more frequency bandwidths, the second frame comprising a reduced physical layer protocol data unit (PPDU) frame, which does not include a medium access control (MAC) payload data portion; and
transmitting, at the first device, a third frame to the second device over the selected at least one frequency bandwidth, the third frame comprising a medium access control (MAC) payload data portion.

2. The method of claim 1, wherein the second frame comprises at least a portion of a preamble portion of a physical layer protocol data unit (PPDU).

3. The method of claim 2, wherein the preamble portion comprises one or more of a short training field (STF), a long training field (LTF), and a signal (SIG) field.

4. The method of claim 3, wherein the identifier comprises a tone on/off pattern of the STF and/or LTF.

5. The method of claim 3, wherein the identifier comprises a value of the SIG field.

6. The method of claim 5, wherein the identifier further comprises a value of a cyclic redundancy check (CRC) field of the SIG field.

7. The method of claim 5, wherein the identifier further comprises a value of a scrambling sequence that scrambles the SIG field.

8. The method of claim 1, wherein the first frame further indicates an occupancy or collision history for the one or more frequency bandwidths, wherein the selection of the at least one frequency bandwidth of the one or more frequency bandwidths is based on the indication of the occupancy or collision history for the one or more frequency bandwidths.

9. The method of claim 1, wherein the first frame further indicates the one or more frequency bandwidths for the first device, wherein the selection of the at least one frequency bandwidth of the one or more frequency bandwidths is based on the indication of the one or more frequency bandwidths.

10. The method of claim 1, wherein the first frame further indicates a total time and/or frequency available for random access by the first device.

11. The method of claim 10, wherein indicating the total time and/or frequency available for random access by the first device comprises setting a network allocation vector (NAV) and indicating a used total bandwidth in the first frame.

12. The method of claim 1, wherein the second frame comprises a null data packet (NDP).

13. The method of claim 12, wherein the NDP comprises a medium access control (MAC) header portion, wherein the identifier comprises a value in the MAC header portion.

14. The method of claim 13, wherein the MAC header portion comprises a control field, wherein the identifier comprises a value of the control field.

15. The method of claim 1, wherein the second frame comprises a physical layer (PHY) waveform.

16. The method of claim 15, wherein the identifier is assigned by the second device.

17. The method of claim 1, wherein the first frame further indicates a duration for the transmission of the second frame.

18. The method of claim 17, wherein transmitting the second frame is based on the transmission of the first frame.

19. The method of claim 1, wherein the first frame further indicates a format for the transmission of the second frame.

20. The method of claim 19, wherein transmitting the second frame is based on the transmission of the first frame.

21. The method of claim 1, wherein the first frame further includes an identifier of the second device.

22. The method of claim 21, wherein the identifier is associated with a resource unit of the one or more frequency bandwidths.

23. An apparatus for wireless communication, comprising:
- a receiver configured to receive a first frame from a second device indicating one or more frequency bandwidths available for random access; and
- a transmitter configured to transmit a second frame to the second device in response to the first frame, the second frame comprising an indication of an identifier of the apparatus and indicating a selection of at least one frequency bandwidth of the one or more frequency bandwidths, the second frame comprising a reduced physical layer protocol data unit (PPDU) frame, which does not include a medium access control (MAC) payload data portion,
- the transmitter further configured to transmit a third frame to the second device over the selected at least one frequency bandwidth, the third frame comprising a medium access control (MAC) payload data portion.

24. The apparatus of claim 23, wherein the second frame comprises at least a portion of a preamble portion of a physical layer protocol data unit (PPDU).

25. The apparatus of claim 24, wherein the preamble portion comprises one or more of a short training field (STF), a long training field (LTF), and a signal (SIG) field.

26. The apparatus of claim 25, wherein the identifier comprises a tone on/off pattern of the STF and/or LTF.

27. The apparatus of claim 25, wherein the identifier comprises a value of the SIG field.

28. A non-transitory computer-readable medium comprising code that, when executed, causes an apparatus to perform a method, the method comprising:
- receiving, at a first device, a first frame from a second device indicating one or more frequency bandwidths available for random access by the first device;
- transmitting, at the first device, a second frame to the second device in response to the first frame, the second frame comprising an indication of an identifier of the first device and indicating a selection of at least one frequency bandwidth of the one or more frequency bandwidths, the second frame comprising a reduced physical layer protocol data unit (PPDU) frame, which does not include a medium access control (MAC) payload data portion; and
- transmitting, at the first device, a third frame to the second device over the selected at least one frequency bandwidth, the third frame comprising a medium access control (MAC) payload data portion.

29. An apparatus for wireless communication, comprising:
- means for receiving, at a first device, a first frame from a second device indicating one or more frequency bandwidths available for random access by the first device;
- means for transmitting, at the first device, a second frame to the second device in response to the first frame, the second frame comprising an indication of an identifier of the first device and indicating a selection of at least one frequency bandwidth of the one or more frequency bandwidths, the second frame comprising a reduced physical layer protocol data unit (PPDU) frame, which does not include a medium access control (MAC) payload data portion; and
- means for transmitting, at the first device, a third frame to the second device over the selected at least one frequency bandwidth, the third frame comprising a medium access control (MAC) payload data portion.

* * * * *